United States Patent
Imoto et al.

(12) 
(10) Patent No.: US 6,329,100 B1
(45) Date of Patent: Dec. 11, 2001

(54) HYDROGEN ABSORBING ALLOY ELECTRODE AND PROCESS FOR PRODUCING SAME

(75) Inventors: Teruhiko Imoto; Yohei Hirota, both of Tokushima; Kikuko Kato, Katano; Nobuyuki Higashiyama, Ikeda; Mamoru Kimoto, Hirakata; Shin Fujitani, Hirakata; Koji Nishio, Hirakata, all of (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/468,297

(22) Filed: Dec. 21, 1999

(30) Foreign Application Priority Data

Dec. 22, 1998 (JP) .................................. 10-363982

(51) Int. Cl.$^7$ ..................................... H01M 4/58
(52) U.S. Cl. ..................... 429/218.1; 420/900
(58) Field of Search .................... 420/900; 429/28.1, 429/218.2, 223

(56) References Cited

U.S. PATENT DOCUMENTS 6,030,725 * 2/2000 Moriwaki et al. ............... 429/218.2
6,096,144 * 8/2000 Ishii et al. ........................... 148/513
6,139,988 * 10/2000 Yamaguchi et al. ............. 429/218.2

FOREIGN PATENT DOCUMENTS

| 4-162353 | 5/1992 | (JP) . |
| 4-179055 | 6/1992 | (JP) . |
| 5-225975 | 9/1993 | (JP) . |

* cited by examiner

*Primary Examiner*—Gabrielle Brouillette
*Assistant Examiner*—M. Wills
(74) *Attorney, Agent, or Firm*—Armstrong, Westerman, Hattori, McLeland & Naughton LLP

(57) ABSTRACT

A hydrogen absorbing alloy electrode is provided which is improved in hydrogen gas absorbing ability and in low-temperature discharge characteristics. The electrode contains a hydrogen absorbing alloy having a crystal structure of the CaCu5 type and represented by the stoichiometric ratio ABx, the hydrogen absorbing alloy being represented by MmNiaCobAlcMd wherein Mm is a misch metal, M is Mn and/or Cu, the atomic ratios a, b, c and d are in the respective ranges of $3.0 \leq a \leq 5.2$, $0 \leq b \leq 1.2$, $0.1 \leq c \leq 0.9$, $0.1 \leq d \leq 0.8$, wherein X is the sum of the atomic ratios a, b, c, and d, such that, X=a+b+c+d and, is in the range of $4.4 \leq X \leq 5.4$. More specifically, the electrode contains a hydrogen absorbing alloy powder at least 5.0 in X, and a hydrogen absorbing alloy powder less than 5.0 in X.

12 Claims, No Drawings

HYDROGEN ABSORBING ALLOY ELECTRODE AND PROCESS FOR PRODUCING SAME

FIELD OF THE INVENTION

The present invention relates to hydrogen absorbing alloy electrodes for use as negative electrodes in nickel-hydrogen cells or batteries.

BACKGROUND OF THE INVENTION

Nickel-hydrogen cells are available which comprise a negative electrode prepared from a hydrogen absorbing alloy which reversibly absorbs or desorbs hydrogen. Nickel-hydrogen cells are known as cells having a high capacity, giving a high output and also high in energy density per unit volume and per unit weight.

It is required that nickel-hydrogen cells be given a still higher capacity. As a primary factor impeding increases in capacity, there is the problem that during charging, especially during rapid charging or overcharging, a side reaction of the charge reaction occurs at the hydrogen absorbing alloy electrode to produce hydrogen gas, increasing the internal pressure of the cell.

To solve this problem, there is a need to cause the electrode to efficiently absorb the hydrogen in its interior. Accordingly, a hydrogen absorbing alloy electrode is known which is prepared from a hydrogen absorbing alloy powder subjected to a water-repellent treatment and thereby held out of direct contact with the electrolyte within the cell to effect a promoted gas-solid reaction between the hydrogen and the alloy powder.

When the alloy is treated for water repellency, the reaction between the hydrogen (gas phase) and the hydrogen absorbing alloy (solid phase) is promoted, but there arises the problem of impeding the cell reaction of the alloy through the electrolyte (liquid phase).

JP-A No. 162353/1992 therefore discloses a hydrogen absorbing alloy electrode which is prepared from two kinds of hydrogen absorbing alloy powders only one of which is subjected to a water-repellent treatment, whereby the electrode is given improved hydrogen gas absorbing ability.

The disclosed electrode nevertheless has the problem of being unsatisfactory in discharge characteristics at low temperatures since the two kinds of hydrogen absorbing alloys have the same stoichiometric ratio represented by $AB_5$ (in atomic ratio).

An object of the present invention is to provide a hydrogen absorbing alloy electrode which is given further improved hydrogen gas absorbing ability and improved low-temperature discharge characteristics.

SUMMARY OF THE INVENTION

To fulfill the above object, the present invention provides a hydrogen absorbing alloy electrode containing a hydrogen absorbing alloy having a crystal structure of the CaCu5 type and represented by the stoichiometric ratio ABx, the hydrogen absorbing alloy being represented by $MmNi_aCo_bAl_cM_d$ wherein Mm is a misch metal, M is Mn and/or Cu, the atomic ratios a, b, c and d are in the respective ranges of $3.0 \leq a \leq 5.2$, $0 \leq b \leq 1.2$, $0.1 \leq c \leq 0.9$, $0.1 \leq d \leq 0.8$, and the sum of the atomic ratios a, b, c, and d, i.e., X=a+b+c+d, is in the range of $4.4 \leq X \leq 5.4$, the hydrogen absorbing alloy electrode containing a powder obtained by mixing a powder of a hydrogen absorbing alloy wherein X is at least 5.0 with a powder of a hydrogen absorbing alloy wherein X is less than 5.0.

It is desired that the hydrogen absorbing alloy powder wherein X is less than 5.0 be subjected to a water-repellent treatment over the surface thereof.

It is desired that the hydrogen absorbing alloy powder wherein X is less than 5.0 be subjected to a surface treatment (acid treatment) with an aqueous acid solution or to a reduction treatment with hydrogen. When the hydrogen absorbing alloy powder less than 5.0 in X is to be subjected to both the water-repellent treatment and the acid treatment or hydrogen reduction treatment, the acid treatment or reduction treatment is conducted before the water-repellent treatment.

The hydrogen absorbing alloy powder wherein X is at least 5.0 contains the component Mm in a smaller amount relative to the component B than the other powder, so that the amount of the hydroxide of Mm formed which is thought detrimental to the electrochemical reaction on the alloy surface is lesser to result in higher discharge characteristics at low temperatures for advantageous charge-discharge reactions. The hydrogen absorbing alloy powder wherein X is less than 5.0 is capable of absorbing hydrogen in a more stabilized state and has high ability to absorb the hydrogen gas to be evolved in the cell in an overcharged state. Accordingly, the hydrogen absorbing alloy electrode prepared from a powder obtained by mixing the two hydrogen absorbing alloy powders is excellent in both the low-temperature discharge characteristics and cell internal pressure characteristics. An improvement in the cell internal pressure characteristics gives the cell a higher capacity.

The lower limit of the value X is 4.4, and the upper limit thereof is 5.4 so as to increase the discharge capacity of the hydrogen absorbing alloy electrode prepared.

The water-repellent treatment conducted for the hydrogen absorbing alloy powder wherein X is less than 5.0 forms a film on the surface of the alloy powder, rendering the powder less likely to come into direct contact with the electrolyte to efficiently absorb the hydrogen to be produced especially during overcharging or rapid charging.

The acid treatment or hydrogen reduction treatment conducted for the hydrogen absorbing alloy powder less than 5.0 in X makes the surface of the powder activated and rich in the component B, rendering the powder surface more readily wettable with the electrolyte to achieve a higher discharge efficiency. When the hydrogen absorbing alloy powder less than 5.0 in X is subjected to the acid treatment or hydrogen reduction treatment and thereafter to the water-repellent treatment, a film is formed by the water-repellent treatment on the power as made rich in the component B by the acid treatment or reduction treatment in advance, whereby the powder is rendered less likely to contact the electrolyte, attaining a further improved hydrogen absorption efficiency and achieving improvements in both low-temperature discharge characteristics and internal pressure characteristics.

DESCRIPTION OF THE PREFERRED EMBODIMENTS

Processes are not limited specifically for preparing a hydrogen absorbing alloy powder represented by $MmNi_aCo_bAl_cM_d$ (wherein Mm is a misch metal, i.e., a mixture of rare-earth metals such as La, Ce, Pr and Nd, M is Mn and/or Cu, the atomic ratios a, b, c and d are in the respective ranges of $3.0 \leq a \leq 5.2$, $0 \leq b \leq 1.2$, $0.1 \leq c \leq 0.9$, $0.1 \leq d \leq 0.8$, and the sum of the atomic ratios a, b, c, and d, i.e., X=a+b+c+d, is in the range of $4.4 \leq X \leq 5.4$) and at least 5.0 in X, and a hydrogen absorbing alloy powder represented by the same formula as above and less than 5.0 in X. Such a powder can be prepared, for example, by weighing out specified amounts of metals, melting the metals in an arc furnace, casting the molten mixture into an ingot, and pulverizing the ingot. The hydrogen absorbing alloy powder prepared is adjusted in particle size as by suitable screening.

The water-repellent treatment for the hydrogen absorbing alloy powder which is less than 5.0 in X is conducted by stirring and kneading the powder in a suspension of PTFE and drying the resulting mixture in a vacuum for the removal of the solvent. This treatment forms a water-repellent film on the surface of the hydrogen absorbing alloy powder for holding the powder out of direct contact with the electrolyte. The film therefore ensures a smooth gas-solid reaction between hydrogen and the hydrogen absorbing alloy powder.

The acid treatment for the hydrogen absorbing alloy powder wherein X is less than 5.0 can be conducted by placing the hydrogen absorbing alloy powder into an aqueous acid solution having a pH of about 1.0, stirring the mixture and thereafter drying the mixture in a vacuum. The acid treatment conducted activates the surface of the hydrogen absorbing alloy powder, making the surface rich in the component B. The component B on the surface of the powder, especially Ni and Co thereon, provide sites of reaction with hydrogen, promoting the absorption and desorption of hydrogen.

The hydrogen reduction treatment for the hydrogen absorbing alloy powder wherein X is less than 5.0 can be conducted by heating the powder in a hydrogen gas atmosphere at 100 to 500° C. Like the acid treatment, the reduction treatment conducted makes the surface of the hydrogen absorbing alloy powder rich in the component B, promoting the absorption and desorption of hydrogen.

The hydrogen absorbing alloy electrode can be prepared by weighing out specified amounts of the hydrogen absorbing alloy powder at least 5.0 in X and the hydrogen absorbing alloy powder less than 5.0 in X, mixing the powders along with a thickener such as an aqueous solution of polyethylene oxide, and coating a current collector, such as an Ni net or punched metal sheet, with the resulting mixture.

An electrode unit can be fabricated by winding up the hydrogen absorbing alloy electrode, a known sintered Ni electrode and an alkali-resistant separator of nonwoven fabric into a roll. A nickel-hydrogen cell can be fabricated by inserting the electrode unit into a cell can and placing an aqueous alkali solution such as an aqueous solution of potassium hydroxide into the can.

The hydrogen absorbing alloy electrode may have incorporated therein a powder of electrically conductive agent, such as Ni, to give enhanced conductivity, in addition to the hydrogen absorbing alloy powders.

EXAMPLE 1

The materials Mm, Ni, Co, Mn and Al were mixed into the composition listed in Table 1, the composition was melted in an arc melting furnace and cast into a hydrogen absorbing alloy ingot of the $AB_x$ type. The ingot obtained was pulverized and then screened to obtain a powder under 100 mesh. Thus, hydrogen absorbing alloy powders [powders (1) to (4)] were prepared by repeating the above procedure.

TABLE 1

| Powder | Alloy composition | X |
|---|---|---|
| ① | $Mm(Ni_{0.72}Co_{0.12}Al_{0.06}Mn_{0.10})_{4.8}$ | 4.8 |
| ② | $Mm(Ni_{0.72}Co_{0.12}Al_{0.06}Mn_{0.10})_{5.0}$ | 5.0 |
| ③ | $Mm(Ni_{0.72}Co_{0.12}Al_{0.06}Mn_{0.10})_{5.2}$ | 5.2 |
| ④ | $Mm(Ni_{0.72}Co_{0.12}Al_{0.06}Mn_{0.10})_{5.0}$ | 5.0 |

A hydrogen absorbing alloy electrode was prepared from a mixture of hydrogen absorbing alloy powders (1) and (2), or (1) and (3) given in Table 1 in the ratio (wt. %) listed in Table 2. A specimen cell of size AA was fabricated using the electrode obtained as the negative electrode. Hydrogen absorbing alloy electrodes and specimen cells No. 1 to No. 10 were prepared by repeating the above procedure, more specifically the processes described below.

[Preparation of Hydrogen Absorbing Alloy Electrode]

A hydrogen absorbing alloy electrode was prepared by adding 160 g of 5% aqueous solution of polyethylene oxide serving as a thickener to 800 g of a hydrogen absorbing alloy powder obtained by mixing hydrogen absorbing alloy powders (1) and (2), or (1) and (3) in the ratio in wt. % listed in Table 2, kneading the mixture along with a double oxide powder added thereto to obtain a pasty slurry, and applying the slurry to opposite surfaces of a punched metal sheet having a thickness of 0.08 mm and plated with Ni.

[Fabrication of Specimen Cell]

A spiral electrode unit was prepared by rolling the electrode thus obtained by a hydraulic press, winding the rolled electrode and a known sintered nickel electrode into a roll with an alkali-resistant separator of nonwoven fabric interposed between the electrodes. The electrode unit obtained was inserted into a cell can, and a 30 wt. % aqueous solution of potassium hydroxide was placed into the can.

For comparison, specimen cells No. 11 to No. 13 were fabricated in the same manner as above with the exception of using hydrogen absorbing alloy powder (1), (2) or (3) singly.

Specimen cells No. 1 to No. 13 were charged and discharged under the following conditions and thereafter checked for low-temperature discharge characteristics and cell internal pressure characteristics.

Measuring Low-Temperature Discharge Characteristics

The specimen cell was charged at 25° C. and 100 mA for 12 hours, then held at rest at 0° C. for 3 hours and thereafter discharged at 1000 mA to measure the discharge capacity when the discharge voltage reduced to 1.0 V (cutoff voltage) as an index of the low-temperature discharge characteristics.

Measuring Cell Internal Pressure Characteristics

The specimen cell was checked for internal pressure while being charged at 1000 mA, and the time (min) taken for the internal pressure of the cell to exceed 10 $kgf/cm^2$ was measured as an index of the cell internal pressure characteristics.

Table 2 shows the results obtained by measuring the low-temperature discharge characteristics and the cell internal pressure characteristics.

TABLE 2

| No. | Powders and mixing ratio (wt. %) | Low-temp. discharge characteristics (mAh) | Cell internal pressure characteristics (min) | Remarks |
|---|---|---|---|---|
| 1 | ①:② = 10:90 | 715 | 103 | Invention |
| 2 | ①:② = 30:70 | 710 | 104 | " |
| 3 | ①:② = 50:50 | 700 | 105 | " |

TABLE 2-continued

| No. | Powders and mixing ratio (wt. %) | Low-temp. discharge characteristics (mAh) | Cell internal pressure characteristics (min) | Remarks |
|---|---|---|---|---|
| 4  | (1):(2) = 70:30 | 690 | 112 | " |
| 5  | (1):(2) = 90:10 | 689 | 113 | " |
| 6  | (1):(3) = 10:90 | 758 | 103 | Invention |
| 7  | (1):(3) = 30:70 | 752 | 105 | " |
| 8  | (1):(3) = 50:50 | 750 | 105 | " |
| 9  | (1):(3) = 70:30 | 713 | 105 | " |
| 10 | (1):(3) = 90:10 | 711 | 105 | " |
| 11 | (1) only | 615 | 93 | Comparative |
| 12 | (2) only | 620 | 90 | " |
| 13 | (3) only | 620 | 89 | " |

Table 2 reveals that specimen cells No. 1 to No. 10 wherein the hydrogen absorbing alloy negative electrode was prepared from a mixture of hydrogen absorbing alloy powders which were different in stoichiometric ratio are satisfactory in these discharge and internal pressure characteristics.

On the other hand, specimen cells No. 11 to No. 13 wherein the hydrogen absorbing alloy negative electrode was prepared from a single hydrogen absorbing alloy powder were low in low-temperature discharge characteristics and also in cell internal pressure characteristics.

The superiority of the specimen cells of the invention over the comparative specimen cells is attributable to the mixture of the hydrogen absorbing alloy powder represented by $AB_x$ wherein X is at least 5.0 and the hydrogen absorbing alloy powder $AB_x$ wherein X is less than 5.0, presumably for the following reason.

The hydrogen absorbing alloy powder at least 5.0 in X contains the component Mm in a smaller amount relative to the component B than the other powder less than 5.0 in X, so that the amount of the hydroxide of Mm formed which is detrimental to the electrochemical reaction on the alloy surface is lesser to result in improved discharge characteristics at low temperatures. On the other hand, the hydrogen absorbing alloy powder wherein X is less than 5.0 is capable of absorbing hydrogen in a more stabilized state and has the function of absorbing the hydrogen gas to be evolved in the cell even in an overcharged state, hence satisfactory cell internal pressure characteristics.

When the specimens of the invention were compared with one another, specimen cells No. 6 to No. 10 wherein the negative electrode was prepared from the mixture of hydrogen absorbing alloy powders (1) and (3) which were greater in stoichiometric ratio difference appeared superior to specimen cells No. 1 to No. 5 in low-temperature discharge characteristics and cell internal pressure characteristics.

EXAMPLE 2

Specimen cells were fabricated in the same manner as in Example 1 except that one of the hydrogen absorbing alloy powders used for specimen cells No. 6 to No. 10 in Example 1 was subjected to a water-repellent treatment, and checked for low-temperature discharge characteristics and cell internal pressure characteristics. For comparison, a specimen cell was fabricated similarly using hydrogen absorbing alloy powders (2) and (4) given in Table 1 after treating power (4) for water repellency.

The cells were fabricated and checked for characteristics under the same conditions as in Example 1 with the exception of conducting the water-repellent treatment for one of the hydrogen absorbing alloy powders used.

For the water-repellent treatment, the hydrogen absorbing alloy powder was stirred and kneaded in a 20 wt. % suspension of PTFE and thereafter dried in a vacuum for the removal of dispersant and water.

Table 3 shows the kinds of powders subjected to the water-repellent treatment and the measurements of low-temperature discharge characteristics and cell internal pressure characteristics.

TABLE 3

| No. | Powders and mixing ratio (wt. %) | Alloy treated for water repellency | Low-temp. discharge characteristics (mAh) | Cell internal pressure characteristics (min) | Remarks |
|---|---|---|---|---|---|
| 21 | (1):(3) = 10:90 | (1) | 810 | 113 | Invention |
| 22 | (1):(3) = 30:70 | (1) | 820 | 115 | " |
| 23 | (1):(3) = 50:50 | (1) | 800 | 111 | " |
| 24 | (1):(3) = 70:30 | (1) | 715 | 110 | " |
| 25 | (1):(3) = 90:10 | (1) | 714 | 110 | " |
| 26 | (1):(3) = 10:90 | (3) | 705 | 106 | " |
| 27 | (1):(3) = 30:70 | (3) | 712 | 107 | " |
| 28 | (1):(3) = 50:50 | (3) | 720 | 108 | " |
| 29 | (1):(3) = 70:30 | (3) | 710 | 108 | " |
| 30 | (1):(3) = 90:10 | (3) | 710 | 107 | " |
| 31 | (2):(4) = 50:50 | (4) | 630 | 102 | Comp. |

Table 3 reveals that specimen cells No. 21 to No. 30 of the invention wherein the water-repellent treatment was conducted for one of the hydrogen absorbing alloy powders which were different in stoichiometric ratio are superior in cell internal pressure characteristics and low-temperature discharge characteristics to specimen No. 31 wherein the water-repellent treatment was conducted for one of the hydrogen absorbing alloy powders which were the same in stoichiometric ratio.

When the specimens of the invention are compared with one another, specimen cells No. 21 to No. 25 wherein the water-repellent treatment was conducted for the hydrogen absorbing alloy powder represented by $AB_x$ and less than 5.0 in X are found greatly improved in low-temperature discharge characteristics and cell internal pressure characteristics over specimen cells No. 26 to No. 30 wherein the treatment was conducted for the hydrogen absorbing alloy powder at least 5.0 in X. This is thought attributable to the water-repellent treatment conducted for the powder less than 5.0 in X and rendering the powder less likely to contact the electrolyte directly, enabling the powder to absorb hydrogen effectively during rapid charging or in an overcharged state. On the other hand, the hydrogen absorbing alloy powder at least 0.5 in X and excellent in high-rate discharge characteristics at low temperatures was not subjected to the water-repellent treatment, therefore preferentially absorbs hydrogen during usual charging and readily desorbs hydrogen during discharge.

Further a comparison between specimen cells No. 21 to No. 25 indicates that improvements are achieved in the low-temperature discharge characteristics and the cell internal pressure characteristics when the ratio (1):(3) is in the range of 10:90 to 50:50.

When the amount of the hydrogen absorbing alloy powder treated for water repellency increases, the low-temperature discharge characteristics slightly lower. This appears attributable to the increase in the amount of this powder which increases the absolute amount of the hydrogen absorbing alloy having difficulty in contacting the electrolyte to entail lower discharge characteristics at low temperatures.

Conversely a decrease in the amount of the hydrogen absorbing alloy powder subjected to the water-repellent treatment reduces the absolute amount of the hydrogen absorbing alloy powder which effectively absorbs hydrogen, therefore leading to lower cell internal pressure characteristics.

Accordingly, the ratio of the hydrogen absorbing alloy powder treated for water repellency to the other powder, i.e., (1):(3), is preferably 10:90 to 50:50.

EXAMPLE 3

Specimen cells No. 41 to No. 44 were fabricated in the same manner as specimen cell No. 7 of Example 1 except that hydrogen absorbing alloy powder (1) was subjected to the water-repellent treatment and/or an acid treatment, and checked for the low-temperature discharge characteristics and the cell internal pressure characteristics in the same manner as in Example 1.

The acid treatment was conducted by placing the hydrogen absorbing alloy powder into an aqueous solution of hydrochloric acid having a pH of 1.0, followed by stirring for 10 minutes and drying in a vacuum.

When both the water-repellent treatment and the acid treatment were conducted, the acid treatment was carried out before the treatment for water repellency.

Table 4 shows the treatment(s) conducted, and the measurements of characteristics values.

TABLE 4

| No. | Water-repellent treatment | Acid treatment | Low-temp. discharge characteristics (mAh) | Cell internal pressure characteristics (min) | Remarks |
|---|---|---|---|---|---|
| 41 | Yes | No | 820 | 115 | Invention |
| 42 | Yes | Yes | 825 | 122 | " |
| 43 | No | Yes | 823 | 114 | " |
| 44 | No | No | 752 | 105 | " |

Powder ① was treated as listed.

Table 4 reveals that specimen cells No. 41 to No. 43 wherein hydrogen absorbing alloy powder (1) was subjected to the water-repellent treatment and/or the acid treatment are improved in low-temperature discharge characteristics and the cell internal pressure characteristics over specimen cell No. 44 obtained with neither of the treatments conducted.

A comparison between specimen cells No. 41 to No. 43 indicates that specimen cell No. 41 fabricated with the water-repellent treatment only conducted is slightly lower in low-temperature discharge characteristics, presumably because the treatment made powder (1) less likely to contact the electrolyte to result in a lower discharge efficiency. In the case of specimen cell No. 43 obtained with the acid treatment only conducted, it is thought that the acid treatment removed oxides from the surface of the powder(1), gave the power surface a composition which is rich in the component B (Ni, Co, Mn and Al), and activated the surface, consequently making the powder surface readily wettable with the electrolyte to achieve an improved discharge efficiency. Especially with specimen cell No. 42 fabricated with the two treatments conducted, the surface of the powder, which was first given a B-rich composition by the acid treatment, was coated with a film by the water-repellent treatment.

Presumably, this enabled the powder to achieve a further improved hydrogen absorption efficiency, hence improvements in discharge and internal pressure characteristics.

EXAMPLE 4

Specimen cells were fabricated in the same manner as in Example 3 except that hydrogen absorbing alloy powder (1) was treated with hydrogen for reduction instead of the acid treatment. The cells were similarly checked for low-temperature discharge characteristics and cell internal pressure characteristics.

The reduction treatment with hydrogen was conducted by heating powder (1) at 300° C. in a hydrogen gas atmosphere.

When both the water-repellent treatment and the reduction treatment were conducted, the latter treatment was followed by the former.

Table 5 shows the treatment(s) conducted and the measurements of characteristics values.

TABLE 5

| No. | Water-repellent treatment | Reduction treatment | Low-temp. discharge characteristics (mAh) | Cell internal pressure characteristics (min) | Remarks |
|---|---|---|---|---|---|
| 51 | Yes | No | 820 | 115 | Invention |
| 52 | Yes | Yes | 820 | 119 | " |
| 53 | No | Yes | 823 | 114 | " |
| 54 | No | No | 752 | 105 | " |

Powder ① was treated as listed.

Table 5 reveals that specimen cells No. 51 to No. 53 wherein hydrogen absorbing alloy powder (1) was subjected to the water-repellent treatment and/or reduction treatment are improved in low-temperature discharge characteristics and the cell internal pressure characteristics over specimen cell No. 54 obtained with neither of the treatments conducted.

A comparison between specimen cells No. 51 to No. 53 shows the following. In the case of specimen cell No. 53 obtained with the hydrogen reduction treatment only conducted, it is thought that the reduction treatment removed oxides from the surface of powder (1), gave the power surface a composition which is rich in the component B (Ni, Co, Mn and Al), and activated the surface, consequently making the powder surface readily wettable with the electrolyte to achieve an improved discharge efficiency. Especially with specimen cell No. 52 fabricated with the two treatments conducted, the surface of the powder, which was first given a B-rich composition by the reduction treatment, was coated with a film by the water-repellent treatment. Presumably, this enabled the powder to achieve a further improved hydrogen absortion efficiency, hence improvements in discharge and internal pressure characteristics.

Apparently, the present invention can be modified or altered by one skilled in the art without departing from the spirit of the invention. Such modifications or alterations are included within the scope of the invention as set forth in the appended claims.

What is claimed is:

1. A hydrogen absorbing alloy electrode containing a first hydrogen absorbing alloy and a second hydrogen absorbing alloy both having a crystal structure of the CaCu5 type and represented by $MmNi_aCo_bAl_cM_d$ wherein Mm is a misch metal, M is Mn and/or Cu, the atomic ratios a, b, c and d are in the respective ranges of $3.0 \leq a \leq 5.2$, $0 \leq b \leq 1.2$, $0.1 \leq c \leq 0.9$, $0.1 \leq d \leq 0.8$, wherein X is the sum of the atomic ratios a, b, c and d, such that, X=a+b+c+d, and is in the range of $4.4 \leq X \leq 5.4$, the hydrogen absorbing alloy electrode being characterized in that the electrode contains a powder of the first hydrogen absorbing alloy wherein X is at least 5.0 and a powder of the second hydrogen absorbing alloy wherein X is less than 5.0.

2. The hydrogen absorbing alloy electrode according to claim 1 wherein the hydrogen absorbing alloy powder wherein X is less than 5.0 has a surface subjected to a water-repellent treatment.

3. The hydrogen absorbing alloy electrode according to claim 1 wherein the hydrogen absorbing alloy powder wherein X is less than 5.0 is surface-treated with an aqueous acid solution.

4. The hydrogen absorbing alloy electrode according to claim 2 wherein the hydrogen absorbing alloy powder wherein X is less than 5.0 is surface-treated with an aqueous acid solution before the water-repellent treatment.

5. The hydrogen absorbing alloy electrode according to claim 1 wherein the hydrogen absorbing alloy powder wherein X is less than 5.0 is subjected to a reduction treatment with hydrogen.

6. The hydrogen absorbing alloy electrode according to claim 2 wherein the hydrogen absorbing alloy powder wherein X is less than 5.0 is subjected to a reduction treatment with hydrogen before the water-repellent treatment.

7. A process for producing a hydrogen absorbing alloy electrode including the steps of:

weighing out specified amounts of a first hydrogen absorbing alloy powder and a second hydrogen absorbing alloy powder both having a crystal structure of the $CaCu_5$ type and represented by $MmNi_aCo_bAl_cM_d$ wherein Mm is a misch metal, M is Mn and/or Cu, the atomic ratios a, b, c and d are in the respective ranges of $3.0 \leq a \leq 5.2$, $0 \leq b \leq 1.2$, $0.1 \leq c \leq 0.9$, $0.1 \leq d \leq 0.8$, wherein X is the sum of the atomic ratios a, b, c and d, such that, $X = a+b+c+d$, and is in the range of $4.4 \leq X \leq 5.4$, the first alloy powder being at least 5.0 in X, the second alloy powder being less than 5.0 in X, mixing the weighted-out first and second alloy powders along with a thickener to prepare a slurry, and coating a current collector with the resulting slurry.

8. The process for producing a hydrogen absorbing alloy electrode according to claim 7 wherein the hydrogen absorbing alloy powder less than 5.0 in X has a surface subjected to a water-repellent treatment.

9. The process for producing a hydrogen absorbing alloy electrode according to claim 7 wherein the hydrogen absorbing alloy powder less than 5.0 in X is surface-treated with an aqueous acid solution.

10. A process for producing a hydrogen absorbing alloy electrode according to claim 8 wherein the hydrogen absorbing alloy powder less than 5.0 in X is surface-treated with an aqueous acid solution before the water-repellent treatment.

11. The process for producing a hydrogen absorbing alloy electrode according to claim 7 wherein the hydrogen absorbing alloy powder less than 5.0 in X is subjected to a reduction treatment with hydrogen.

12. The process for producing a hydrogen absorbing alloy electrode according to claim 8 wherein the hydrogen absorbing alloy powder less than 5.0 in X is subjected to a reduction treatment with hydrogen before the water-repellent treatment.

* * * * *